US008978251B2

(12) United States Patent
Petzendorfer et al.

(10) Patent No.: US 8,978,251 B2

(45) Date of Patent: Mar. 17, 2015

(54) METHOD OF MANUFACTURE OF COMPRESSED AIR TANKS FOR UTILITY VEHICLES

(75) Inventors: Wolfgang Petzendorfer, Reichertshausen (DE); Alexander Koegel, Ulm (DE); Steffen Zanek, Schwaebisch Gmuend (DE)

(73) Assignee: Erhard & Soehne GmbH, Schwaebisch Gmuend ( * ) Notice: Subject to any disclaimer, the term of this patent is extended or adjusted under 35 U.S.C. 154(b) by 123 days.

(21) Appl. No.: 13/140,171

(22) PCT Filed: Dec. 17, 2009

(86) PCT No.: PCT/EP2009/067405

§ 371 (c)(1), (2), (4) Date: Jun. 16, 2011

(87) PCT Pub. No.: WO2010/070044

PCT Pub. Date: Jun. 24, 2010

(65) Prior Publication Data

US 2011/0253727 A1 Oct. 20, 2011

(30) Foreign Application Priority Data

Dec. 19, 2008 (DE) ......................... 10 2008 063 859
May 8, 2009 (DE) ......................... 10 2009 020 385

(51) Int. Cl.
*B23K 26/00* (2014.01)
*F17C 1/00* (2006.01)

(52) U.S. Cl.
CPC ........... *F17C 1/00* (2013.01); *F17C 2201/0109* (2013.01); *F17C 2201/0119* (2013.01); *F17C 2201/056* (2013.01); *F17C 2203/0607* (2013.01); *F17C 2203/0617* (2013.01); *F17C 2203/0639* (2013.01); *F17C 2203/0643* (2013.01); *F17C 2203/0646* (2013.01); *F17C 2203/0648* (2013.01); *F17C 2205/0305* (2013.01); *F17C 2209/221* (2013.01); *F17C 2209/234* (2013.01);

(Continued)

(58) Field of Classification Search
USPC .............. 29/897.2, 463; 220/62.11, 289, 581, 220/601, 917
See application file for complete search history.

(56) References Cited

U.S. PATENT DOCUMENTS 5,697,515 A * 12/1997 Syler et al. ................. 220/62.11
6,120,832 A * 9/2000 Walsh et al. ...................... 427/8

(Continued)

FOREIGN PATENT DOCUMENTS

DE 10017021 A1 10/2001
DE 20023422 U1 5/2004

(Continued)

*Primary Examiner* — Alexander P Taousakis

(74) *Attorney, Agent, or Firm* — GrayRobinson, PA

(57) ABSTRACT

The invention relates to a compressed air tank for utility vehicles, comprising a tubular or cylindrical jacket sealed at both ends by way of welded outer bases. At least one outer base and/or the jacket is provided with a hole. A sleeve is welded onto the hole. At least the inside of the compressed air tank is provided with an inner coating. The contact surfaces between the jacket and the outer bases are adapted such that the contact surfaces abut one another and such that the contact surfaces can be welded together without using any weld material through laser welding. The sleeve is welded onto the hole by way of laser welding or CD welding. The inner coating of the tank is manufactured by powder coating.

3 Claims, 5 Drawing Sheets

(52) U.S. Cl.
CPC ... *F17C 2221/031* (2013.01); *F17C 2223/0123* (2013.01); *F17C 2223/035* (2013.01); *F17C 2223/036* (2013.01); *F17C 2260/013* (2013.01); *F17C 2260/053* (2013.01); *F17C 2270/0168* (2013.01); *F17C 2270/0181* (2013.01); *F17C 2270/0772* (2013.01)
USPC ............................................ 29/897.2; 29/463

(56) References Cited

U.S. PATENT DOCUMENTS

| | | | | |
|---|---|---|---|---|
| 6,371,323 | B1 * | 4/2002 | Fernandes | 220/62.22 |
| 7,011,779 | B2 * | 3/2006 | Fernandes | 264/138 |
| 2001/0017300 | A1 * | 8/2001 | Zdunek et al. | 220/581 |
| 2003/0150858 | A1 * | 8/2003 | Outreman et al. | 220/62.11 |
| 2005/0006393 | A1 * | 1/2005 | Carter | 220/581 |
| 2006/0169704 | A1 * | 8/2006 | Brunnhofer | 220/581 |
| 2006/0261073 | A1 * | 11/2006 | Kanno | 220/581 |
| 2008/0107503 | A1 * | 5/2008 | Eckert et al. | 413/1 |
| 2008/0187697 | A1 * | 8/2008 | Amano | 428/35.7 |

FOREIGN PATENT DOCUMENTS

| | | |
|---|---|---|
| DE | 202005018579 U1 | 2/2006 |
| JP | 2003-010780 | 1/2003 |
| JP | 2004-084915 | 3/2004 |
| JP | 2008-183600 | 8/2008 |

* cited by examiner

METHOD OF MANUFACTURE OF COMPRESSED AIR TANKS FOR UTILITY VEHICLES

CROSS REFERENCE TO RELATED APPLICATIONS

This application claims priority under 35 U.S.C. Sections 119(a)-(d), 120, 363 and 365 to International Patent Application No. PCT/EP2009/067405, filed Dec. 17, 2009 which designated the United States and at least one other country in addition to the United States and claimed priority to German Application Nos. 10 2008 063 859.5 filed Dec. 19, 2008 and 10 2009 020 385.0 filed May 8, 2009. PCT/EP2009/067405, German Application No. 10 2008 063 859.5 and German Application No. 10 2009 020 385.0 are expressly incorporated by reference herein in their entirety to form a part of the present disclosure.

FIELD OF THE INVENTION

The invention relates to a compressed air tank for utility vehicles

The invention further relates to a method for manufacturing compressed air tanks and to an apparatus for implementing the method.

BACKGROUND OF THE INVENTION

Compressed air tanks for utility vehicles are known from the general state of the art and are used for various functionalities, in particular for supplying compressed air to air suspensions of utility vehicles.

Compressed air tanks can be used in utility vehicles to supply a multiplicity of consuming devices. In addition to compressed-air brake systems and air suspensions, these consuming devices can also take the form, for example, of lifesaving systems, (for example airbags) or systems which alter the tire pressure of utility vehicles. Pressure tanks are used, however, not only in the field of utility vehicles and passenger vehicles, but also in respect of other vehicles, for example rail vehicles.

A pressure tank for supplying vehicles, in particular utility vehicles, with a pressurized gaseous medium is known, for example, from DE 20 2005 018 579 U1.

Traditional pressure tanks have a tubular or cylindrical peripheral wall (casing), the open end faces of which are sealed, generally welded, with appropriate caps (outer bases). A cavity for storing the designated gas is thereby formed. The cavity can be loaded and/or unloaded via ports or bores in the casing or in the outer bases.

DE 20 2005 018 579 U1 describes an advantageous embodiment of a compressed air tank such that at least one outer base is configured integrally with the casing. If necessary, both outer bases can also be configured integrally with, respectively, a part of the peripheral wall.

In general terms, compressed air tanks must be able to withstand mechanical loads resulting from internal or external pressure, as well as further mechanical, physical (temperature) and chemical loads. A commonly used material for the manufacture of appropriate pressure tanks is steel. Steel tanks have in essence the advantage of high mechanical strength, and thus high compressive strength, and also good temperature resistance. On the other hand, the chemical resistance of steel with respect to corrosive substances is rather poor. Steel tanks are also relatively susceptible to external weather influences, so that an additional outer and, if necessary, inner coating or paint coating is generally provided. In the prior art, the inner coating of a compressed air tank is obtained by virtue of a so-called wet paint coating, which does not however yield satisfactory results and, in particular, cannot be applied in a cost-effective manner. In the known compressed air tanks, moreover, the problem exists that, at the junction between the outer base and the peripheral wall (casing), a so-called dirt-collecting edge (also termed a chemical edge) is formed. Particles, or in general terms impurities, stick to this edge, which then hinder or prevent the application of an inner coating there. The dirt-collecting edge which is formed when the outer base is connected to the casing can be seen, for example, from FIG. 6 of DE 20 2005 018 579 U1. The outer base has in general an inwardly tapered bead (lead-in chamfer), over which the casing or the peripheral wall is slid. A contact region is thereby created, which is then next welded by a MAG welding process such that the outer base is connected to the casing.

In the compressed air tanks known from the prior art in which both outer bases are configured independently from the casing, two such dirt-collecting edges are consequently formed. Although the embodiment according to FIG. 1 of DE 20 2005 018 579 U1 avoids such dirt-collecting edges, it does however demand a higher cost for the manufacture of the sleeves.

A drawback of the MAG welding process for connecting the outer base to the casing consists in the MAG welding process being relatively slow.

A further problem with the compressed air tanks known from the prior art consists in the fitting of sleeves onto or around the bores in the outer bases or in the casing. The bores serve various purposes, for example the connection of lines. Such connections can be seen, for example, from FIG. 1 of DE 200 23 422 U1, which shows a plastic compressed air tank. In a configuration of a metal pressure tank, it is generally provided to weld sleeves onto the bores in the outer base or the casing. Here, the sleeves are again welded on by a MAG welding process. A drawback with this is that the welding-on of the sleeve engenders a high cost, since the MAG welding process is relatively slow and welding material, moreover, is necessary.

SUMMARY OF THE INVENTION

The object of the present invention is to solve the drawbacks of the prior art, in particular to provide a compressed air tank for utility vehicles which can be manufactured in a cost-effective and simple manner.

The object of the present invention is also to provide an advantageous method for manufacturing a compressed air tank, as well as an apparatus for implementing the method.

By virtue of the fact that the contact surfaces between the casing and outer bases are designed such that the contact surfaces abut squarely or obtusely one against the other and a connection is realized without welding material by laser welding, a compressed air tank without the previously usual dirt-collecting or chemical edge is provided, i.e. the previously present, inwardly tapered protrusion or bead on the outer bases, over which the casing is slid in order to prepare for a weld joint, is dispensed with by the solution provided according to the invention.

The solution according to the invention provides on the inner side of the tank a surface which is optimally suitable for painting and coating, since projections and recesses (dirt-collecting edges or chemical edges) are avoided. A high quality is thereby obtained for the painting or coating. A situation in which residues can collect on the inner edges, which residues, during operation, travel through the lines and possibly cause problems in brake lines or the like, is thereby avoided.

The outer bases can be connected to the casing in a quick and reliable manner by a circumferential weld seam, produced by laser welding. In order to enable the use of a laser, the respective contact surfaces are prepared such that the contact surfaces to be connected can be abutted squarely or obtusely or to size one against the other. The gap which is hereupon formed between the contact surfaces should be as small as possible, i.e. the contact surfaces are precisely worked such that the resulting gap is small, i.e. suitable for laser welding.

For the production of an optimal weld seam, it can be advantageous to align the laser such that the laser beam hits the gap between the two contact surfaces such that no light gap is present.

In one embodiment of the invention, it can be provided that the mutually aligned contact surfaces have a bevel of up to forty five degrees)(45°, preferably fifteen degrees plus or minus five degrees (15°+/−5°). The mutually aligned contact surfaces can here preferably have an identical bevel. The effect of the bevel is that, when the outer base is applied to the end face of the casing, a self-centering of the two components is obtained. The bevel can be configured such that a type of dovetail joint is obtained between the two components to be connected.

The bevel can be configured to both fall and rise from inside to out. In both cases, a self-centering of the components is obtained, at the same time as a light gap is avoided.

The drawback with the bevel consists in the fact that it engenders an additional manufacturing cost. It is therefore preferably provided that the contact surfaces have no bevel, i.e. the contact surfaces run or lie in a radial plane of the compressed air tank or extend in a plane standing perpendicular to the axis of the pressure tank.

It is advantageous if the laser, in addition to the welding of the outer bases to the end faces of the casing, is also used to provide the casing (after bending) with a longitudinal weld seam.

It is advantageous if two laser heads are used to produce the orbital weld seam for connecting an outer base to the casing, which laser heads simultaneously weld the contact surface between the outer base and the casing. A further speed advantage is thereby obtained.

All weld joints for the manufacture of the compressed air tank, i.e. the longitudinal weld seam and the two orbital weld seams, for example, can be produced by means of the laser without welding material. One advantage is that in this case no oxide layer is formed, since the component is only lukewarm.

According to the invention it is further provided that the sleeve is welded onto the bore by laser welding or by CD welding.

This enables the sleeve to be welded on substantially more quickly than in the prior art. An addition of welding material is no longer necessary.

A further advantage of laser welding consists in the fact that the visually unattractive weld seam bead which is regularly formed in MAG welding is avoided. In laser welding, moreover, no cleaning of the weld seam is necessary, so that this operation, which is frequently necessary in the case of a MAG weld seam, can be dispensed with.

Compressed air tanks generally have a plurality of sleeved bores, which bores are arranged both in one or both outer bases and/or on the casing. It is here advantageous if the inner diameter of the bore is somewhat larger than the inner diameter of the sleeve. The sleeve can be configured in a known manner, preferably with an internal thread. The sleeve is preferably made of steel or special steel.

The bores or holes in the outer base can be produced, for example, by piercing dies or by punches.

It is advantageous if the laser welds the sleeve to the compressed air tank circumferentially, radially on the outside.

In one embodiment, it can be provided that the sleeve has an indentation, a chamfer, a (preferably wedge-shaped) groove or the like, which is arranged such that between this and the compressed air tank there remains a burr formed by the sleeve, an annular projection or the like. It can here be provided that the laser beam of a laser applied from outside penetrates into the indentation, the chamfer or the groove such that the burr or the annular projection of the sleeve is welded to the adjacent material of the compressed air tank. The sleeve is thereby able to be welded to the compressed air tank in a particularly reliable, quick and robust manner. It is additionally advantageous if the welding of the sleeve to the compressed air tank is realized radially on the outside and circumferentially on the bottom side of the sleeve. Hence no gap, into which impurities might possibly penetrate, is present between the sleeve and the compressed air tank.

The welding of the sleeve by a laser applied on the outside is suitable both for welding of the sleeve on the outer bases and on the casing.

Alternatively or in addition thereto, it can also be provided that the laser, in particular in order to weld sleeves onto bores of the outer base, is applied from inside. Preferably, the laser can here weld an annular surface of the sleeve to the compressed air tank, which annular surface lies radially as far out as possible. Hence, a radially circumferential gap between the sleeve and the compressed air tank is once again avoided.

The fusion edge should preferably lie radially as far out as possible.

One advantage of the sleeve being welded on by the laser being applied to the inner side of an outer base consists in the fact that the sleeve fuses particularly advantageously with the material of the compressed air tank. The welding process, as the inventor has discovered, can here be managed in a particularly reliable manner. The process is particularly suitable for fitting sleeves to the outer base, since in this case the laser can be applied particularly easily to the inner side of the outer base. The sleeves can here preferably be welded onto the outer base before the outer base is welded to the casing, since the laser cannot be used to weld in the casing.

A further option for welding the sleeve onto or around the bore of the compressed air tank consists in using a so-called CD welding process. CD welding process means Capacitor Delivery welding. CD welding is a special form of projection welding and, as the inventors have discovered, has particular advantages in the connection of sleeves to compressed air tanks. Through an appropriate earthing of the compressed air tank, a permanent and reliable welding of the sleeve at the designated location on the compressed air tank can be realized, followinglication of the sleeve, within just a few milliseconds by an appropriate burst of current. The sleeve can be applied, for example by means of a copper die, at the designated location on the compressed air tank. The sleeve is then welded onto the compressed air tank by the use of a suitable burst of current. A particular advantage consists in the fact that, by using an appropriate number of copper dies, it is possible to weld a plurality of sleeves simultaneously in a single operation.

In a particularly advantageous refinement of the invention, it can be provided that the sleeve has on its bottom side adjoining the compressed air tank at least one fusion edge, which is connected to the compressed air tank by CD welding. The connection of the sleeve to the compressed air tank is thus realized not by areal welding, but simply by welding of the (preferably annularly) circumferential fusion edge to the adjacent material of the compressed air tank. In this context, the inventor has recognized that an areal welding of the sleeve is disadvantageous compared to the configuration of a fusion edge on the bottom side of the sleeve. It is advantageous if the fusion edge annularly encircles the bottom side of the sleeve radially on the outside (as far out as possible). A radially circumferential gap between the top side of the compressed air tank and the bottom side of the sleeve is thereby avoided. If necessary, a plurality of circumferential fusion edges can be formed or a plurality of fusion points or fusion lines can be present on the bottom side of the sleeve. The welding of the sleeve on the compressed air tank is thereby further improved, though the fusion edges add to the cost of manufacture of the sleeve.

It is advantageous if two annularly circumferential fusion edges are formed. In this case, one fusion edge can be configured such that it encircles the bottom side of the sleeve radially on the outside, and the other one such that it encircles it radially on the inside. This avoids a situation in which dirt or impurities can penetrate beneath the sleeve. If necessary, a plurality of, for example, five circumferential fusion edges may also be provided.

It is advantageous if an apparatus for conducting the CD welding process is provided, which apparatus has dies which resiliently bias the sleeve against the compressed air tank in order to ensure that the sleeve, when current is applied, is pressed against the compressed air tank. The welding process is thereby further improved. Preferably, the springs press against the sleeve with a slight pretension.

It is particularly advantageous if the sleeve has a form which enables the sleeve to be inserted, at least with a section, into the bore. Preferably, the sleeve can here be inserted into the bore in the casing or in one of the outer bases of the compressed air tank to the point, where the bottom side of the sleeve lies substantially in one plane with the adjoining inner side of the compressed air tank. Dirt-collecting and chemical edges are thereby avoided. The insertion of the sleeve into the bore can be enabled, for example, by the sleeve having an outer diameter which is slightly smaller than the inner diameter of the bore. If necessary, a press fit can also be provided. Alternatively, it can also be provided that the sleeve has a projection, a boss, a taper or a step which is inserted into the bore. The sleeve can here have in total an outer diameter which is larger than the inner diameter of the bore, so that the sleeve can be mounted from outside onto the bore and only the taper or the projection of the sleeve juts into the bore. The sleeve can thus rest substantially flat upon the outer side of the compressed air tank and be welded to the tank from outside.

Irrespective of whether the sleeve is welded by means of laser or CD welding, it has proved advantageous if that region of the casing and/or of the outer bases which surrounds the bore is flat or flattened. The casing, but also the outer bases, generally have a curvature. Hitherto, this has been tolerated and appropriately compensated by the application of filler wire. The inventor has recognized, however, that the welding of the sleeve is able to be considerably improved if the region onto which the sleeve is to be welded has no curvature. A flattening can be produced particularly advantageously by a stamping tool.

According to the invention, it is provided that the inner coating of the tank is produced by a powder coating. In the previously known pressure tanks, the coating is applied by a wet coating process (wet painting). This appeared necessary, since, because of the projections and edges on the inner side of the tank, it was felt that only a wet coating process could ensure a complete inner coating. Now that, according to the invention, dirt-collecting edges and the like on the inner side of the tank are avoided, the advantages of a powder coating process can be exploited.

In this context, it is advantageous if the powder coating is applied electrostatically to the inner side of the tank, preferably by a tribo charge. The inventor has recognized that though the use of a powder coating process is particularly suitable, it can pose problems in terms of the realization. A powder coating of the casing and of the outer base before these are welded together has proved less suitable. More advantageously, the powder coating should only be applied once the casing and the outer bases are welded together. In this case, the problem arises itself that the powder has to be introduced into the pressure tank. Furthermore, it is necessary to ensure that the powder sticks there to the inner side of the tank such that a full and reliable coating is achieved. The inventor has here recognized that this is best achieved by an electrostatic powder coating process and, particularly preferably, by the use of a tribo charge. By an electrostatic powder coating process is understood, in general terms, both a corona charge and a tribo charge. The corona charge is a high-voltage process. In the case of the tribo charge, the powder particles are driven at high speed along the surface, whereby they are charged. For the introduction of the powder into the compressed air tank, a tribo lance can be used. Preferably, a sleeve opening or one of the bores in the compressed air tank, preferably one of the bores in the outer base of the compressed air tank, can here be used as the access opening. By means of a nozzle or a spray head on the tip of the tribo lance, the powder which has been charged by the friction can be sprayed into the interior of the pressure tank. Due to the charge, the powder attaches to the inner side of the compressed air tank.

The process of the electrostatic charging and the attachment to the inner wall is fundamentally known. The inventor has recognized that, with the compressed air tank, an optimal, reliable and even powder distribution in the interior of the compressed air tank is obtained. This, in particular, since the geometry in the interior of the compressed air tank, according to the invention, has been created such that projections and recesses are no longer present.

According to the invention, it can be provided that the tribo lance is first driven sufficiently far into the compressed air tank that that end of the compressed air tank which is remote from the access opening can be provided with a coat of powder. As the powder is being sprayed out, the tribo lance can then be withdrawn, so that an even distribution of the powder is ensured.

The inner coating can next be dried at a temperature of one hundred fifty degrees Celsius to two hundred fifty degrees Celsius (150° C. to 250° C.), preferably two hundred degrees Celsius plus or minus ten degrees Celsius (200° C.+/−10° C.)

In the method according to the invention for manufacturing a compressed air tank for utility vehicles, it is firstly provided that a cylindrical or tubular casing is bent out of a sheet blank. It is further provided that two outer bases are produced by drawing or stamping and are welded to the end faces of the casing. Preferably prior to being welded together, at least one outer base and/or the casing are provided with a bore, onto which a sleeve is welded. The sleeve can here likewise already be welded on before the casing is put together with the outer bases, but also afterward. It is provided that at least the inner side of the compressed air tank is provided with an inner coating. According to the invention, it is here provided that the inner coating is produced by a powder coating. It is further provided according to the invention that the contact surfaces between the casing and the outer bases are designed such that the contact surfaces can be abutted squarely or obtusely one against the other, whereafter the contact surfaces are joined together by laser welding without welding material. According to the invention, it is further provided that the sleeve is applied to the bores by laser welding or by CD welding.

A particularly preferred apparatus for conducting the process with regard to the production of a powder coating on the inner side of the compressed air tank is obtained from an apparatus having a lance, preferably a tribo lance having a spray head for insertion into the compressed air tank. In addition, the apparatus should have a bolt having an inner bore for insertion into a bore in the outer base in order to produce an access opening for the lance. In addition, a beam should be provided, in order to receive the compressed air tank such that the access opening is aligned downward. Furthermore, a device should be provided, in order to introduce the lance through the access opening and withdraw it again in the course of delivery of the coating powder.

It has proved advantageous if that part of the lance which is to be introduced into the bolt, as well as the spray head, have a diameter of no more than twenty millimeters (20 mm), preferably of no more than fifteen millimeters (15 mm). The lance with the spray head is thereby able to be inserted through the inner bore of the bolt into the compressed air tank particularly easily.

It is advantageous if the apparatus has a device for pretreating the inner side of the compressed air tank. The pretreatment can here consist in cleaning the inner side of the compressed air tank, for example in degreasing it, washing it and clearing it of chemicals. The following coating process is thereby improved.

The tribo lance can consist, for example, of a plastic, preferably of polyamide or polyethylene. Preferably, the beam is configured such that a plurality of compressed air tanks can be fitted, for example twelve compressed air tanks. It can here be advantageous if a corresponding number of tribo lances and bolts is provided.

It is advantageous if the compressed air tank is first fixed on the beam. After this, the bolt, which is provided with an inner bore, can be inserted into the access opening. The bolt can here preferably have a lead-in aid, for example a funnel, through which the lance can be inserted.

The apparatus can have a device for drying the applied powder, the device preferably being designed such that the drying takes place at a temperature of one hundred fifty degrees Celsius to two hundred fifty degrees Celsius (150° C. to 250° C.), preferably two hundred degrees Celsius plus or minus ten degrees Celsius (200° C.+/−10° C.). This drying process is fundamentally known from the prior art.

The tribo lance can also be made of Teflon or have Teflon. The spray head is preferably configured such that it sprays in all directions, i.e. both radially and to the front and rear.

The compressed air tank according to the invention is suitable for any chosen gases.

The compressed air tank can, if necessary, have an outer base configured integrally with the casing, as is represented in FIG. 6 of DE 20 2005 018 579 U1.

BRIEF DESCRIPTION OF THE DRAWINGS

Illustrative embodiments of the invention are represented schematically below with reference to the drawings, wherein.

DETAILED DESCRIPTION

Compressed air tanks for utility vehicles are sufficiently known from the general state of the art, for which reason their basic working method and their integration into a utility vehicle are not examined in detail below. Reference is simply made to DE 20 2005 018 579 U1 and to DE 200 23 422 U1.

The compressed air tank 1 according to the invention is suitable for absorbing high pressures, of over 70 bar for example.

Figure 1:
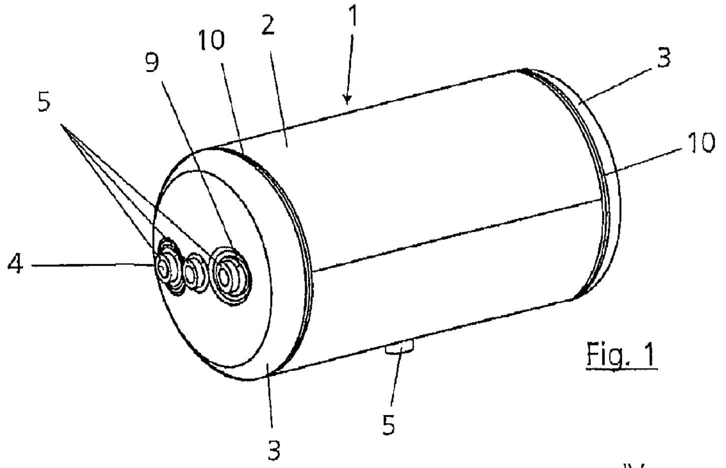
FIG. 1 shows a perspective representation of a compressed air tank.
Figure 2:
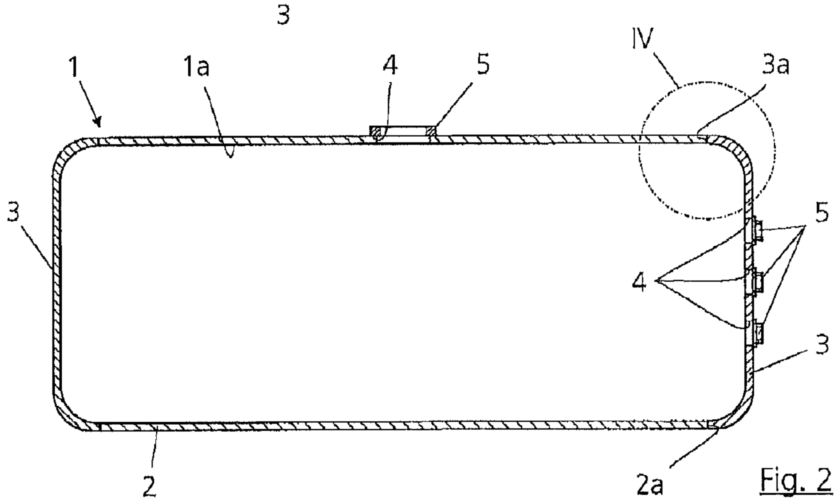
FIG. 2 shows a longitudinal section through a compressed air tank.

FIGS. 1 and 2 show a compressed air tank 1 for utility vehicles which is formed of a tubular or cylindrical casing 2 and two outer bases 3. The casing 2 can be produced, for example, from a correspondingly large sheet blank by bending. The outer bases can be produced in a fundamentally known manner by drawing or by stamping.

In the illustrative embodiment, the outer bases 3 are of saucer-shaped configuration or have a depression.

As the material for the casing 2 and the outer bases 3, various materials are suitable, in the illustrative embodiment it is provided that the casing 2 and the outer bases 3 are formed of metal, preferably steel or special steel, or alloys thereof. In principle, compressed air tanks 1 can also be formed of aluminum or aluminum alloys.

In the illustrative embodiment, the compressed air tanks 1 have a length between two hundred millimeters (200 mm) and fourteen hundred millimeters (1400 mm). It has proved advantageous to configure the shortest tank with a length of two hundred millimeters (200 mm) to three hundred millimeters (300 mm) and the longest tank with a length of thirteen hundred millimeters (1300 mm) to fourteen hundred millimeters (1400 mm).

Figure 3:
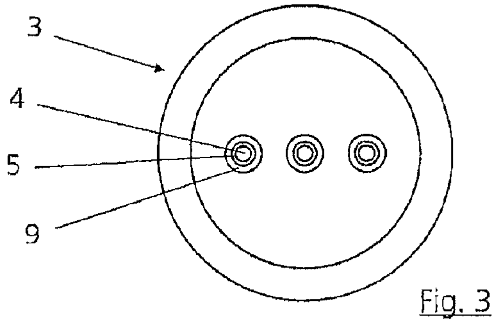
FIG. 3 shows a top view of an outer base of a compressed air tank.
Figure 10:
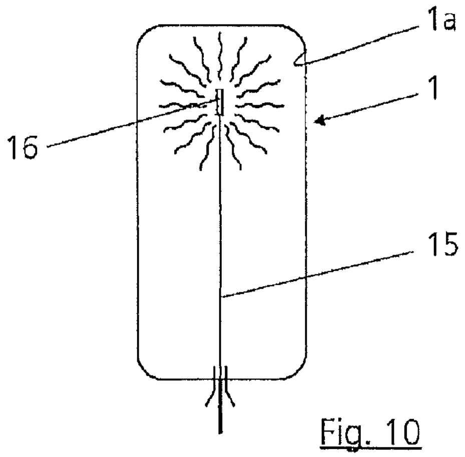
FIG. 10 shows a longitudinal section through a compressed air tank with a schematic representation of a tribo lance inserted into the compressed air tank.

As is evident from FIGS. 1 to 3, the compressed air tank 1 has bores 4 both in the casing 2 and in one of the outer bases 3, which bores can be used for the connection of various lines, for example to the consuming devices or for the drainage of condensation water. The bores 4 are respectively provided with a sleeve 5, which in the lead-out region can be provided with an internal thread to enable the simple connection of ongoing lines. The inner side 1*a* of the compressed air tank 1 is provided with an inner coating 6, the application of which is not represented in detail in FIGS. 10 and 11.

As is evident in particular from FIGS. 1 through 4*a* and 4*b*, the casing 2 has contact surfaces 2*a* and the outer bases 3 have contact surfaces 3*a*, which are designed such that the contact surfaces 2*a*, 3*a* abut (squarely or obtusely) one against the other. The casing 2 and the outer bases 3 can be welded together at the contact surfaces 2*a*, 3*a* without welding material by laser welding. A laser 7 which is used for this purpose is represented schematically in FIG. 4. In the illustrative embodiment, it is provided that the laser 7 has two laser heads, which simultaneously weld together the contact surfaces 2*a*, 3*a* between an outer base 3 and the casing 2. Alternatively, two or more lasers may also, of course, be used.

It has proved advantageous if the casing 2 has a material thickness of two point two millimeters plus or minus zero point five millimeters (2.2 mm+/−0.5 mm).

Figure 4A:
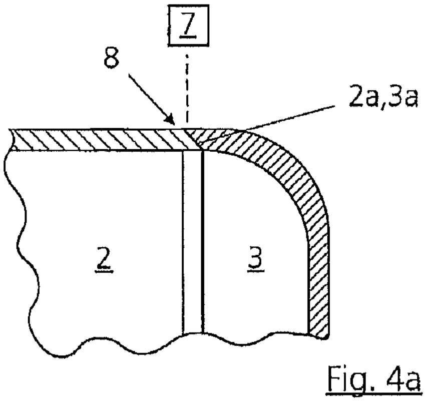
FIG. 4*a* shows an enlarged longitudinal section through a selected portion of a compressed air tank according to the detail IV of FIG. 2, in the region of the plane of contact between the contact surfaces of an outer base and of the casing, with oblique-running contact surfaces.

FIG. 4*a* shows contact surfaces 2*a*, 3*a* which are inclined in relation to a radially extended plane of the compressed air tank 1 or have an angle to the radial. A bevel 8 is thereby formed, which bevel can measure up to 45°, preferably 15°. This gives a self-centering of the outer base 3 relative to the casing 2.

For the production of the bevel 8, in the illustrative embodiment it is provided to stamp the edges of the casing 2 or of the outer bases 3.

Figure 4B:
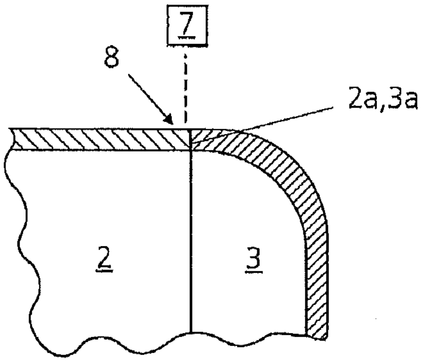
FIG. 4*b* shows an enlarged longitudinal section through a selected portion of a compressed air tank according to the detail IV of FIG. 2, in the region of the plane of contact between the contact surfaces of an outer base and of the casing, with straight-running contact surfaces.

FIG. 4*b* shows an alternative embodiment to FIG. 4*a* of the contact surfaces 2*a*, 3*a*, which are not inclined in relation to a radially extending plane of the compressed air tank 1 or run in the plane. The contact surfaces 2*a*, 3*a* thus abut one against the other in a straight or flat arrangement, i.e. without inclination one to the other. This embodiment is preferable to the embodiment represented in FIG. 4*a*.

The bores 4 in the casing 2 and the outer base 3 can preferably be formed by punching. It is here provided that the bores 4 or the holes are punched from inside to out. Next, the region around the bore 4 can be provided by means of a stamping die (in a non-detailed manner) with a flattening 9. The flattening 9 is represented schematically in FIG. 3. In the illustrative embodiment, a flattening 9 is provided at all bores 4.

The sleeve 5 can be applied onto the bore 4 on the outside and welded to the adjacent material of the compressed air tank 1. In the illustrative embodiment according to FIGS. 5 to 9, it is provided that the inner diameter of the bore is larger than the inner diameter of the sleeve 5.

In the illustrative embodiment, the welding of the sleeves 5 on the compressed air tank 1 is realized by laser welding or by CD welding.

In the illustrative embodiment, the sleeve 5 is made of metal, preferably of steel or special steel.

Figure 5:
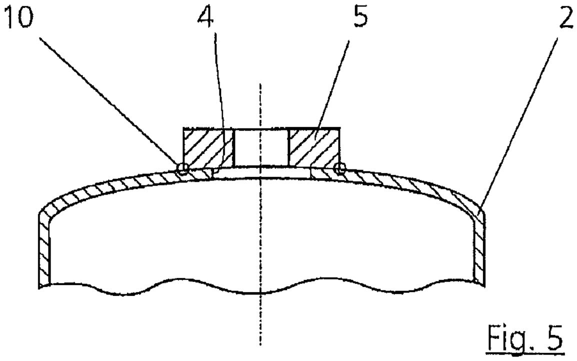
FIG. 5 shows a sectional representation of that region of an outer base in which a sleeve is welded onto a bore.

According to FIG. 5, it is provided that the sleeve 5 has a substantially uniform outer circumference. If necessary, it can be provided that the end-face edges are slightly chamfered. According to FIG. 5, it is here provided that the laser 7 is applied from outside, i.e. to the outer side of the outer base or of the casing 2. The laser 7 is intended to weld the sleeve 5 to the adjacent material of the compressed air tank 1 as far out as possible in the radial direction and in annularly circumferential configuration. An advantageous positioning of a weld seam 10 produced by the laser 7 is represented schematically in FIG. 5.

Figure 6:
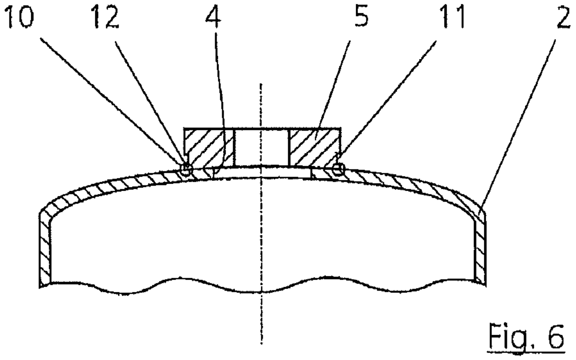
FIG. 6 shows a particularly suitable design of a sleeve for welding the latter to the compressed air tank by means of a laser.

FIG. 6 shows a particularly suitable form of the sleeve 5 for conducting the laser welding process described according to FIG. 5. The sleeve 5 here has an indentation 11 or groove, which is arranged in the peripheral wall of the sleeve 5 such that a burr 12 formed by the sleeve 5, or an annular projection, remains between the indentation 11 or groove and the outer side of the compressed air tank 1. The laser beam of the laser 7 applied from outside penetrates preferably into the indentation 11 or groove in order to fuse or weld the burr 12 or the annular projection of the sleeve 5 to the adjacent material of the compressed air tank 1. A preferably provided positioning of the resulting weld seam 10 is represented by dashed lines in FIG. 6. The indentation can also have a wedge-shaped course, so that beneath the wedge-shaped groove there remains a burr or an annular projection for welding to the underlying material of the compressed air tank. Alternatively thereto, the bottom side of the sleeve 5 may also be provided circumferentially with a chamfer.

Figure 7A:
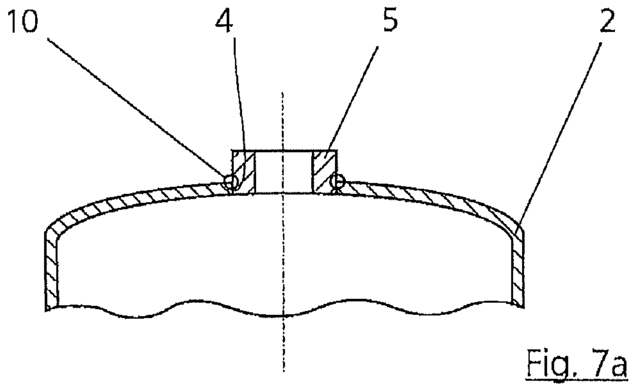
FIGS. 7*a* to 7*c* show three further suitable designs of a sleeve for welding the latter to the compressed air tank by means of a laser applied to the outside.
Figure 7B:
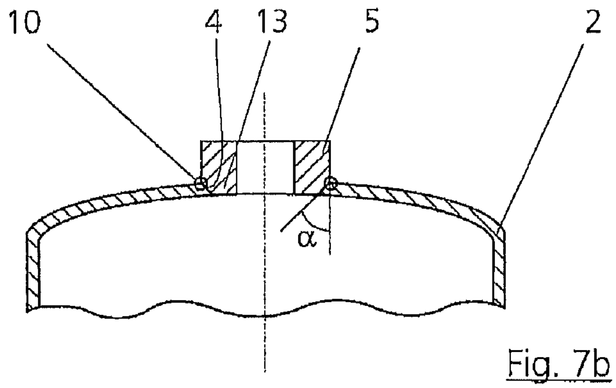
Figure 7C:
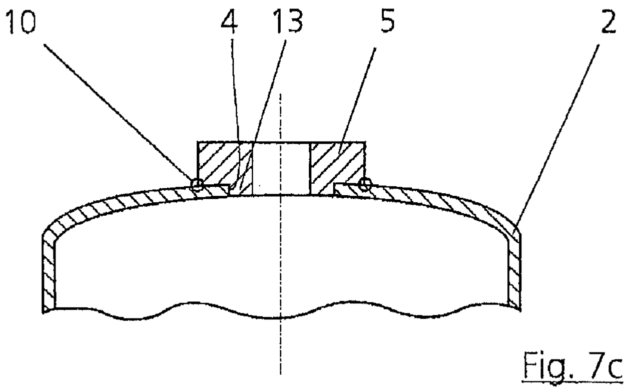

FIGS. 7*a* to 7*c* show three particularly suitable forms of sleeves. FIGS. 7*a* to 7*c* also show a particularly suitable solution for welding the sleeve 5 to the compressed air tank 1.

As is evident from FIGS. 7*a* to 7*c*, in the preferred embodiment of the sleeve 5 it is provided that this has an outer diameter which is smaller than the inner diameter of the bore 4. The sleeve 5 can hence be introduced or inserted into the bore 4, at least with a section of its axial length, and is welded there.

FIG. 7*a* shows an embodiment in which the sleeve 5 has an outer diameter which is substantially constant over its axial length. The sleeve 5 is here inserted with an end-face end into the bore 4 and welded there. Preferably, the sleeve 5 can be inserted into the bore 4 to the point where the bottom side of the sleeve 5, which bottom side is inserted into the bore 4, is substantially flush with the inner side of the outer base 3 or of the casing 2.

The welding of the sleeve 5 according to FIG. 7*a* can be realized by a laser 7 applied on the outer side and/or inner side. In FIG. 7*a*, an externally applied weld seam 10 is represented.

The advantage of the solution represented in FIG. 7*a* consists in the fact that the sleeve 5 can be produced in a particularly cost-effective manner, preferably as a turned part.

According to the embodiment represented in FIGS. 7*b* and 7*c*, it is provided that the sleeve 5 has on its bottom side facing the bore 4 a taper 13 and/or an axially prominent projection and/or a boss. The taper 13 and/or the projection and/or the boss here have, at least at their end facing away from the sleeve 5, an outer diameter which is smaller than the inner diameter of the bore 4. The sleeve 5 can thus be inserted with its taper 13 or the projection or boss into the bore 4, as is represented in FIGS. 7*b* and 7*c*.

According to the embodiment represented in FIGS. 7*b* and 7*c*, it can be provided that the taper 13 or the projection or boss is integral with the sleeve 5. As is also evident from FIGS. 7*b* and 7*c*, the course of the outer diameter of the taper 13 or projection or boss is preferably tailored to the course of the inner edge of the bore 4. The taper 13 is thereby able to be inserted particularly easily into the bore 4. It is further ensured that, in the laser welding, no light gap is present.

As is evident from FIGS. 7*b* and 7*c*, the taper or the projection or boss has an outer diameter which at least approximately completely fills the bore 4. In both embodiments, the weld seam 10 can be formed from the inside and/or from the outside. In FIGS. 7*b* and 7*c*, a weld seam 10 is formed from the outside by means of laser welding. This embodiment is preferable.

As is evident from FIG. 7*b*, the sleeve has in this embodiment a taper 13 or a projection or boss with an oblique course. The taper 13 or the projection or boss has a chamfered outer edge, so that the outer diameter of the taper 13 or projection or boss tapers toward the free end thereof. The angle α of the chamfer can here measure, for example, thirty degrees (30°) to seventy degrees (70°), preferably sixty degrees (60°). As a result of the chamfer, a self-centering is obtained.

FIG. 7*c* shows a particularly preferable embodiment of the sleeve 5. It is here provided that the taper 13, projection or boss is configured as a step of substantially constant outer diameter. The sleeve 5 can here be produced as a turned part. It is hence unnecessary to produce the bore 4 in the outer base 3 or in the casing 2 with a chamfer. Alternatively, a chamfer can additionally be provided, however, in the outer base.

As a result of the relinquishment of the chamfer in the outer base 3 or in the casing 2, the bore 4 can be produced in a particularly simple and cost-effective manner by punching.

According to the embodiment represented in FIG. 7*b* and that represented in FIG. 7*c*, it can be provided that the bottom side of the taper 13 runs substantially in one plane with the inner side of the outer base 3 or of the casing 2 in the region of the bore 4.

The advantage of the embodiments represented in FIGS. 7*a* to 7*c* over the embodiments according to FIGS. 5 and 6 consists in the fact that no dirt-collecting edge is formed within the compressed air tank 1, since, as a result of the form and arrangement of the sleeve 5, recesses on the inner side of the compressed air tank 1 are avoided.

In principle, the illustrative embodiments represented in FIGS. 7*a* to 7*c* can be combined with the further features which have been represented with respect to the other embodiments or generally with respect to the invention.

Figure 8:
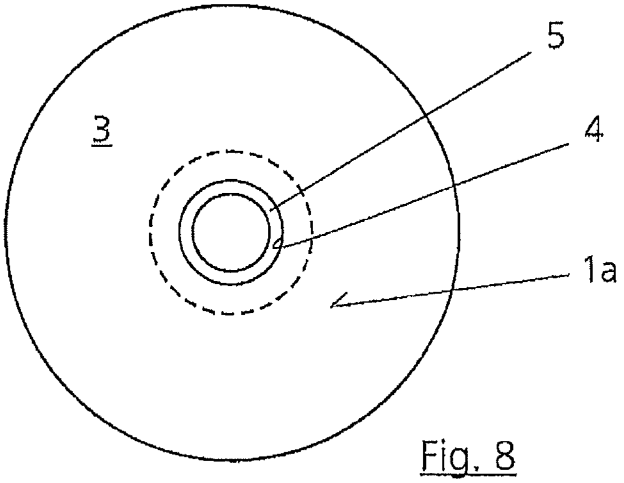
FIG. 8 shows a view of an inner side of an outer base to which a sleeve is applied on the outside, which sleeve is welded to the outer base by a laser applied to the inner side.

FIG. 8 shows schematically an alternative welding of the sleeve 5 to the compressed air tank 1. It is here provided that the laser 7 is applied to the inner side of an outer base 3. The sleeve 5 mounted on the outside of the compressed air tank 1 is thus welded on the bore 4 by action of the laser 7 upon the inner side of the outer base 3. Preferably, the laser 7 is applied such that it welds a radially outer annular surface of the sleeve 5 to the adjacent material of the compressed air tank 1. The radially outer annular surface is represented by dashed lines in FIG. 8. Since the inner diameter of the sleeve 5 is smaller than the inner diameter of the bore 4, the inner edge of the sleeve 5 overlaps the inner edge of the bore 4. According to the invention, it can also be provided that the laser welds not just one annular surface of the sleeve 5 to the adjacent material of the compressed air tank, but two or more.

Figure 9:
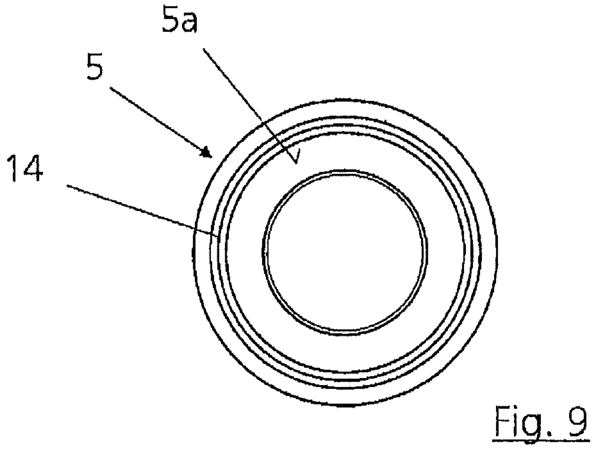
FIG. 9 shows a view of a bottom side of a sleeve having a fusion edge for the use of a CD welding process.

FIG. 9 shows a further option for welding the sleeve 5 onto the bore 4 or onto the compressed air tank 1. For this, a CD welding process is used. The sleeve 5 is applied at the designated location on the compressed air tank 1 and is welded to the adjacent material of the compressed air tank 1 by a short burst of current or by the use of the CD welding process. As is evident from FIG. 9, the sleeve 5 has on its bottom side 5*a* a circumferential fusion edge 14. The fusion edge 14 here has an annular course. The fusion edge 14 is connected or fused to the compressed air tank by the CD welding process. Preferably, the fusion edge 14 has a wedge-shaped course, i.e. tapers starting from the bottom side 5*a* of the sleeve 5, in the direction of the compressed air tank 1. If necessary, two or more fusion edges 14 can also be configured on the bottom side 5*a* of the sleeve 5. It is advantageous if the fusion edge 14 annularly encircles the bottom side 5*a* of the sleeve 5 radially on the outside.

The compressed air tank 1 which is represented in the illustrative embodiment has an inner coating 6 on the inner side 1*a* of the compressed air tank, which is produced by a powder coating process. In the illustrative embodiment, it is here provided that the powder coating is applied electrostatically to the inner side 1*a* of the compressed air tank and, for this purpose, a tribo charge is used. As is evident from FIG. 10, in the illustrative embodiment it is provided that the powder coating is introduced into the compressed air tank 1 by a tribo lance 15. The tribo lance 15 here has a spray head 16, which delivers powder both radially and to front and rear. This is represented correspondingly in FIG. 10.

Figure 11:
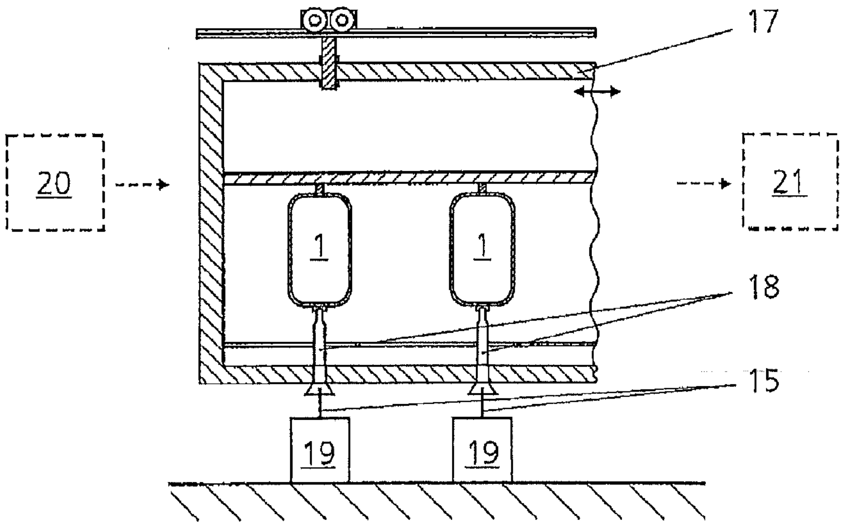
FIG. 11 shows an advantageous apparatus for the inner coating of a pressure tank in a schematic representation.

A particularly suitable apparatus for conducting the powder coating is represented in FIG. 11. Here a beam 17 is provided to receive a plurality of compressed air tanks 1. For each compressed air tank 1, a tribo lance 15 having a spray head 16 is here provided. In addition, a bolt 18 having an inner bore is provided. The bolt 18 is inserted into a bore 4 in the outer base 3 in order thus to provide an access opening for the lance 15. That part of the tribo lance 15 which is to be introduced into the bolt 18, as well as the spray head 16, are preferably intended to have an outer diameter of no more than twenty millimeters (20 mm), particularly preferably no more than fifteen millimeters (15 mm). The apparatus represented in FIG. 11 also has a device 19 for introducing the tribo lances 15 through the access opening and for withdrawing them again as the coating powder is delivered. According to FIG. 11, a device 20 for pretreating the inner side 1*a* of the compressed air tank 1 is further provided. In addition, a device 21 for drying the applied powder at a temperature of 150° C. to 250° C., preferably 200° C., is provided. The beam 17 can be movable by an appropriate suspension mounting. The beam 17 fixes the compressed air tank 1 both at the top and at the bottom. It is provided that a plurality of compressed air tanks 1 are treated simultaneously.

In the illustrative embodiment, it is provided that also the outer side of the compressed air tank 1 is provided with a powder coating.

While the foregoing constitute preferred embodiments of the invention according to the best mode presently contemplated by the inventor of making and carrying out the invention, it is to be understood that the invention is not limited to the particulars described above. In light of the present disclosure, various alternative embodiments and modifications will be apparent to those skilled in the art. Accordingly, it is to be recognized that changes can be made without departing from the scope of the invention has particularly pointed out and distinctly claimed in the appended claims as properly construed to include all legal equivalents.

What is claimed is:

1. A method for manufacturing a compressed air tank for utility vehicles, in particular for air suspensions of utility vehicles, said method comprising the steps of:

(a) forming a tubular or cylindrical casing having a pair of end faces;

(b) forming at least two bases by drawing or stamping, at least one of said bases and/or said casing, having a bore peripherally surrounded by an exterior surface;

(c) laser welding one of said bases to a first one of said pair of end faces of said casing and, laser welding another one of said bases to a second one of said pair of end faces;

(d) providing a sleeve having an opening which passes through said sleeve and having an external peripheral wall located around said opening, said peripheral wall having an indentation, a chamfer or a groove; said indentation, said chamfer or said groove forming a burr or an annular projection;

(e) arranging said sleeve in said bore such that said burr or said annular projection of said sleeve is adjacent said exterior surface, and;

(f) circumferentially laser welding said sleeve circumferentially to said exterior surface by directing a laser beam to fuse said burr or said annular projection, to said exterior surface.

2. A method as claimed in claim 1, wherein said casing and said bases are formed of metal and further comprising the step of: forming a coating on an inner side of the compressed air tank using an electrostatic powder coating process after carrying out the steps of claim 1.

3. A method as claimed in claim 2, wherein said electrostatic powder coating process comprises a process in which a powder coating is applied to said inner side of the compressed air tank using a tribo lance introduced into the compressed air tank.

* * * * *